Patented July 29, 1930

1,771,549

UNITED STATES PATENT OFFICE

ROBERT E. PHELAN AND SHERWIN P. LOWE, OF DENVER, COLORADO, ASSIGNORS TO ROSCOE H. CHANNING, JR., AGENT, OF SAN FRANCISCO, CALIFORNIA

FLOTATION CONCENTRATION

No Drawing. Original application filed October 18, 1927, Serial No. 227,048. Divided and this application filed October 11, 1928. Serial No. 311,962.

Our invention relates to a process for use in the flotation of ores. In many sulphide ores which are amenable to flotation, there are various percentages of mica, talc or other micaceous or talcy minerals which float more or less readily and thereby the grade of the concentrates is lowered. These minerals may otherwise be an undersirable constituent of the concentrates.

This application is a division of a co-pending application Ser. No. 227,048 filed Oct. 18, 1927, now Patent 1,690,907, granted Nov. 6, 1928.

One method that has been disclosed of depressing mica and thereby preventing it from entering the froth is by the use of starch. We have discovered however that the starch acts in various ways, depending upon the condition of the pulp from which the forth concentrate is obtained, sometimes not depressing the mica at all but, on the contrary, in certain cases, aiding it to float. Under some circumstances, this is an end very greatly desired.

We have discovered the following principles in connection with the use of starch.

1. When the pulp is acid or neutral the addition of starch and the usual flotation oils and reagents will prevent the mica from entering the froth.

2. When the pulp is alkaline, the addition of starch and cyanide and the usual flotation reagents will cause the mica to enter the froth and prevent the sulphide minerals from so doing.

When the pulp is alkaline the addition of starch and the usual flotation reagents will not prevent the mica from entering the froth, but if the starch is mixed with acid and added to an alkaline pulp the mica will be prevented from entering the froth, i. e. be depressed.

When starch and sodium cyanide are added to an alkaline pulp, the sulphides are depressed and the mica floated and the higher the alkalinity, the less of the other minerals and the more of the mica that is floated.

When it is desirable to float mica in preference to sulphides, the ore must be ground fine enough to free the minerals and mixed with from one to six parts of water; at this point the pulp should be made distinctly alkaline, preferably with lime to about .3 lbs. of lime per ton of water; then add sufficient starch and cyanide to prevent the sulphides from floating, then add about .05 lbs. of pine oil per ton of ore and float, removing the mica with the froth. The amount of cyanide and starch needed depends on the composition of the ore.

The more sulphides present the larger the quantity of starch and cyanide needed.

Two examples to show the effects mentioned above are as follows:

A. A mixed copper mica concentrate in a pulp containing .3 lbs. of lime per ton of water was treated with .4 lbs. of starch and 2/10th lbs. cyanide per ton of ore and floated with results as follows:

|  | Per cent Cu | Per cent mica |
|---|---|---|
| Heads | 7.0 | 50.0 |
| Concentrates | 1.9 | 80.0 |
| Tails | 13.9 | 10.0 |

B. An ore was ground with sufficient lime and four parts of water to give an alkalinity of .2 lbs. per ton of water, .8 lbs. of starch and .2 lbs. of cyanide and .05 lbs. of pine oil per ton of ore were then added to the pulp and the mica removed with the froth.

|  | Per cent Cu | Per cent mica |
|---|---|---|
| Heads | 2.0 | 35.0 |
| Concentrates | .2 | 83.0 |
| Tails | 1.9 | 5.0 |

In flotation, it is at times necessary to float the ore in a neutral or acid pulp and with other ores, an alkaline pulp is used to produce the best results. When the pulp is neutral or acid the addition of starch alone is sufficient to depress the mica; if the pulp is alkaline it is necessary to add acid and starch to depress the mica which greatly increases the cost.

Equal weights of starch and sulphuric acid are used as the additional agent by us but we have found the proportion may be widely varied and still obtain satisfactory results. As examples, an ore containing 1% copper and 20% mica was treated as follows:

The ore was ground with 3 lbs. of lime per ton and a weight of water equal to that of the ore, additional water was then added to give a dilution of three parts of water to one part of ore, this pulp which showed an alkalinity of .2 lbs. per ton was subjected to a flotation treatment to obtain a copper concentrate in the usual manner, i. e. .03 lbs. of pine oil and .2 lbs of xanthate were added and a froth was removed, this froth contained copper sulphides, iron sulphides, mica and other substances. The products were as follows:

|  | Per cent Cu | Per cent mica |
|---|---|---|
| Froth | 8.0 | 40.0 |
| Tails | .2 | 6 |

The froth was treated in three ways for comparison as to value of different treatments with starch, the object being to so treat the pulp that when it was refloated in a flotation machine, a high grade Cu concentrate could be removed with the froth and the bulk of the mica would be found in the residue.

.3 lbs. of starch added in a 1% solution per ton of original mill feed was added to the froth which was then refloated. This gave a froth assaying 10% Cu, 45% mica and tailings assaying 1% Cu and 10% mica.

3/10th lbs. of starch and .3 lbs. of sulphuric acid per ton of original mill feed were mixed into a 1% solution and this solution added to the froth which was then refloated. This gave a froth assaying 20% Cu, 8% mica and tailings assaying .9% Cu and 60% mica.

.3 lbs. of starch added in a 1% solution and 15 lbs. of sulphuric acid per ton of original mill feed were added to the froth giving the pulp an acidity of .05% sulphuric acid, which pulp was refloated, producing a froth assaying 21% Cu, 6% mica and tailings assaying .8% Cu and 65% mica.

The proportion of starch and acid are variable depending upon the ore being treated; enough acid must be used to cause the water in the pulp to have a strongly acid reaction, the amount needed may vary from 1 lb. to 100 lbs. per ton of ore. Enough starch must be used to depress the mica. This depends on the amount present and its tendency to float and may vary from .01 lbs. to 2 or more lbs. per ton of ore and can be determined by experiment.

There are a great number of acids and alkalies which will produce the effects above mentioned and the choice of any particular one is governed by local circumstances as every ore requires different amounts and sometimes different kinds of reagents depending upon its composition. Even the ore produced from the same mine on different days requires different amounts of reagents.

In a strongly acid pulp by proper additions of acid and starch, the mica and to a considerable extent the iron pyrites are prevented from floating so that only the more valuable sulphides are floated.

When a solution of starch is mixed with a small amount of acid or acid substance and this solution added to an alkaline or strongly alkaline pulp, the mica is depressed and the sulphides floated the same as if the pulp was acid or neutral and this occurs in the alkaline pulp in a much more efficient manner than without the addition of acid to the starch previous to its addition to the pulp.

What we claim, is:—

1. In a froth flotation process, the method of separating micaceous and talcy minerals from sulphides comprising the addition of starch and cyanide to an alkaline pulp to cause the said minerals to enter the froth and to prevent the sulphides from so doing, and then subjecting the ore pulp to froth flotation.

2. In a froth flotation process, the method of treating a mass of pulp and of separating the micaceous and talcy minerals from the concentrates therein, which comprises establishing a desired alkaline reaction in said pulp mass, adding a quantity of starch and a reagent to depress the concentrates and cause the micaceous and talcy minerals to enter the froth, and subjecting the mass to froth flotation.

3. In a froth flotation process, the method of treating a mass of pulp containing micaceous and talcy minerals which comprises establishing an alkaline reaction in the presence of starch to cause the micaceous minerals to enter the froth and subjecting the mass while alkaline to froth flotation.

In testimony whereof, we affix our signatures.

R. E. PHELAN.
SHERWIN P. LOWE.